United States Patent [19]

Willberg

[11] Patent Number: 4,857,838

[45] Date of Patent: Aug. 15, 1989

[54] APPARATUS FOR TESTING ELECTRONIC COMPONENTS, IN PARTICULAR IC'S

[76] Inventor: Hans-Heinrich Willberg, Malerwinkelweg 23, D-8201 Altofing/Bad Feilnbach, Fed. Rep. of Germany

[21] Appl. No.: 45,429

[22] Filed: May 4, 1987

[30] Foreign Application Priority Data

May 12, 1986 [DE] Fed. Rep. of Germany ....... 3615941

[51] Int. Cl.$^4$ .............................................. G01R 1/04
[52] U.S. Cl. ............................. 324/158 F; 324/73 R; 324/158 P; 901/6
[58] Field of Search ........... 324/158 P, 158 F, 73 PC, 324/73 R; 901/6

[56] References Cited

U.S. PATENT DOCUMENTS

| | | | |
|---|---|---|---|
| 3,144,947 | 8/1964 | Pittwood | 901/6 |
| 3,564,408 | 2/1971 | Schulz et al. | 324/73 R |
| 4,527,942 | 7/1985 | Smith | 414/590 |
| 4,588,346 | 5/1986 | Smith | 414/673 |
| 4,589,815 | 5/1986 | Smith | 414/590 |
| 4,616,178 | 10/1986 | Thornton, Jr. et al. | 324/158 F |
| 4,626,780 | 12/1986 | Powers et al. | 324/158 F |
| 4,705,447 | 11/1987 | Smith | 414/590 |

FOREIGN PATENT DOCUMENTS

| | | | |
|---|---|---|---|
| 0102217 | 3/1984 | European Pat. Off. | |
| 0882097 | 5/1943 | France | 414/590 |

*Primary Examiner*—Reinhard J. Eisenzopf
*Assistant Examiner*—W. Burns
*Attorney, Agent, or Firm*—Scully, Scott Murphy & Presser

[57] ABSTRACT

An apparatus for testing electronic components, on which a testing device can be mounted, provided with a connecting plug for electrical connection of the electrical leads and couplings. Each coupling is provided with a fixed and movable coupling member for mechanical connection, with the couplings securing the testing device in the apparatus in a centered position by the inclined plane method. Stable coupling of the test device to the apparatus is desirable and is achieved by arranging at least three couplings in the form of a star on the appropriate attachment side.

5 Claims, 2 Drawing Sheets

APPARATUS FOR TESTING ELECTRONIC COMPONENTS, IN PARTICULAR IC'S

TECHNICAL FIELD OF THE INVENTION

The invention relates to an apparatus for testing electronic components according to the preamble of claim 1.

BACKGROUND OF THE INVENTION

An apparatus of this kind is described and illustrated in European Patent Application No. 0 102 217: see in particular FIGS. 5A and 5B.

In the known design two couplings are provided for fastening the testing device to the connection side of the apparatus that receives it, these couplings being halfway up the testing device, i.e. to the right and left of the plug connection that is arranged approximately in the middle. The moveable parts of the couplings are arranged on the testing device and comprise cylinders with peripheral grooves in the form of screw threads, rotatable about axes at right angles to the connection side. The fixed coupling members, in the form of lugs arranged on the apparatus, are held in the peripheral grooves. Coupling is effected by rotating the cylinder around the above-mentioned axis, whereby the testing device is pressed against the connection side of the apparatus because of the arrangement of the peripheral grooves on the inclined plane principle. The cylinders are connected together by an endless driving cord near the periphery of the testing device, engaged by a common drive motor for rotation of the cylinders.

The known design gives a relatively loose coupling of the testing device, since the abutment faces (cf. FIG. 5C) that are formed by the end faces of attachments that receive centering pins are relatively small. Enlargement of the abutment faces would necessarily lead to higher costs of construction.

OBJECTS OF THE INVENTION

The object of the invention is to design an apparatus of the kind indicated above so that stable coupling of the testing device to the apparatus is possible.

SUMMARY OF THE INVENTION

In the design according to the invention at least three couplings are arranged in the form of a star on the attachment side. These give a stable coupling, since support points arranged in the form of a star approach in effectiveness a supporting or abutment surface of similar size. The individual abutment surfaces on the couplings can then be of relatively small dimensions, so that the couplings can be designed to economize in space and be inexpensive. In contrast to the known design, there is no possibility in the design according to the invention of the testing device tilting about an imaginary horizontal line through the plug connection.

The design according to claim 2 makes possible both simple guidance and simple actuation of the moveable coupling elements.

The features of claims 3 and 4 also contribute to simplification, since in these solutions the components having the more complicated shape are arranged on the apparatus, on which they can be formed more simply and easily since the testing device is a considerably more delicate part.

The forms according to claims 5 and 6 are advantageous in that the weight of the testing device itself can be utilized for coupling or pressing the testing device on to the apparatus. The designs according to claims 7 to 9 likewise contribute to simple construction. It should be noted with regard to the design according to claim 8 that with four couplings the guidance of the respective moveable coupling parts and their actuation can be made considerably simpler.

The features of claims 10 and 11 also contribute to a simple construction from ergonomic points of view.

BRIEF DESCRIPTION OF THE DRAWINGS

The invention will now be described with reference to an exemplary embodiment illustrated in the drawings, in which.

DETAILED DESCRIPTION OF A PREFERRED EMBODIMENT OF THE INVENTION

Figure 1:
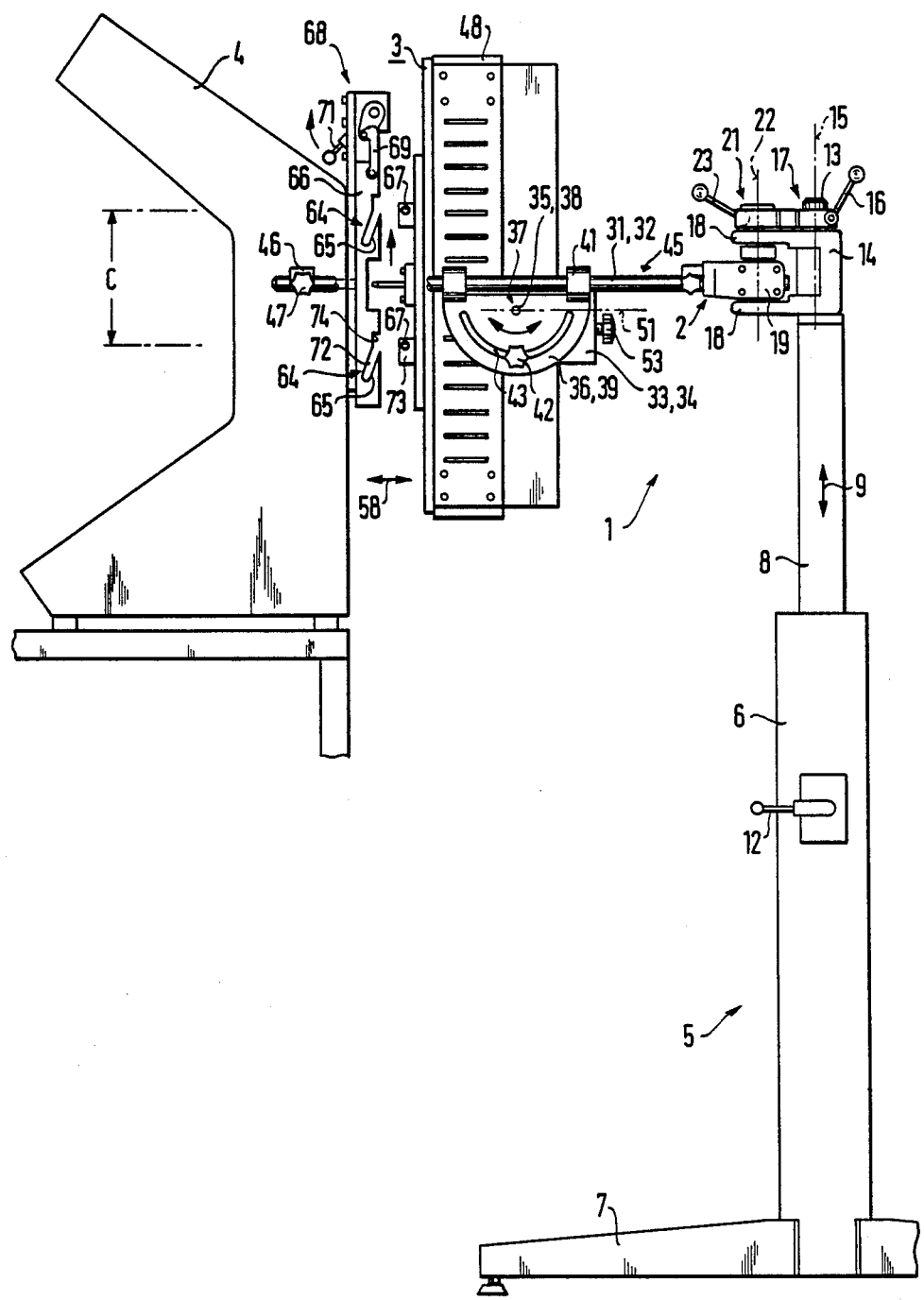
FIG. 1 shows in side elevation a device designed according to the invention for manipulation with little effort and for the most precise possible positioning of a testing computer on an apparatus for testing electronic components.

The device indicated generally in FIG. 1 by 1 serves to manipulate and position a testing computer, indicated generally by 3 and carried by a supporting frame 2 of the device 1, for the purpose of attaching it to an apparatus for testing electrical components, so that the mechanical and electrical connecting elements provided engage with one another.

The device consists of a stand, indicated generally by 5, having a guide tube 6 to which radially splayed supporting feet 7 are attached at its lower end and in which a pillar 8 is housed so that its height can be adjusted. (see the double arrow 9). The pillar 8 can be fixed in any given position by a clamping lever 12 on the guide tube 6. A so-called air spring with pressure equalization (not shown) is arranged in the guide tube 6, which enables height adjustments to be made with little effort.

Figure 2:
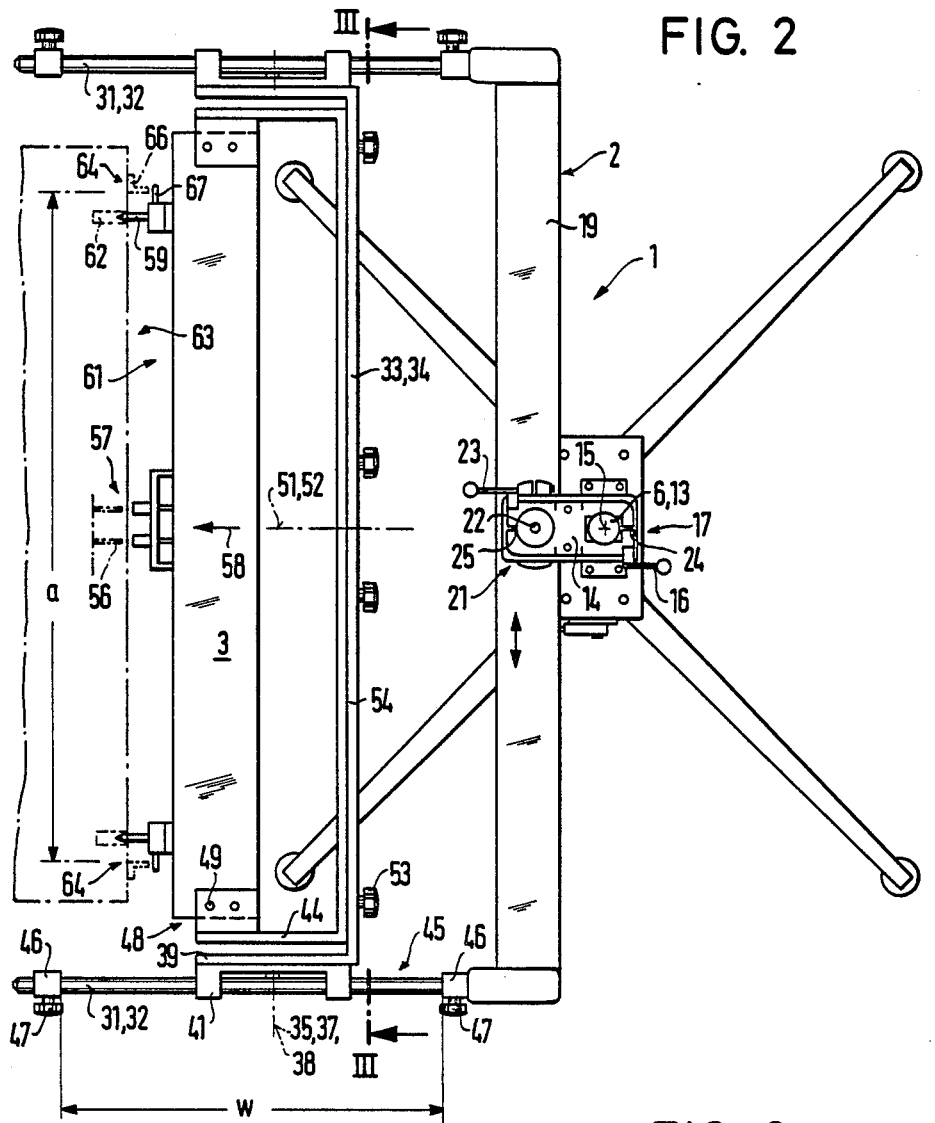
FIG. 2 shows the device in plan.
Figure 3:
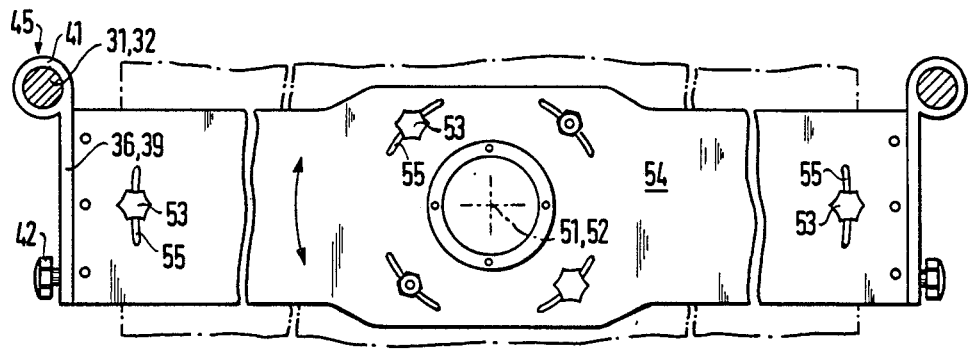
FIG. 3 shows the section III—III in FIG. 2.

At the upper end of the pillar 8 a swivel head 14 is mounted on a lug 13 forming the free end of the pillar 8 to pivot about a vertical first axis 15, namely the central axis of the pillar 8 or of the guide tube 6. A clamping lever 16 on the swivel head 14 enables it to be secured in a given angular position. It is also possible to mount the pillar 8 to swivel in the guide tube 6 about the first axis 15; in this case the first linkage 17 between the swivel head and the pillar 8, containing the first axis 15, could be omitted. The swivel head 14, as seen in the side view, is formed as a U with two horizontal arms 18 that embrace the web 19 of the supporting frame 2 and form, together with the web 19, a second linkage 21 with a vertical axis 22 in which the supporting frame 2 can swivel horizontally and can be held in any given angular position by a clamp lever 23 arranged on the swivel head 14. Clamping is facilitated by slots 24, 25 in the swivel head 14, shown in FIG. 2.

The supporting frame 2 consists of the web 19 and bearer arms 31 pointing from their free ends towards the apparatus 4 and comprising round bars 32 secured in recesses in the web 19. Extending between the bearer arms 31 is a traverse, indicated generally by 33, consisting of a U-shaped frame 34, open towards the apparatus 4, of sheet material arranged on edge, which can swivel about a horizontal second axis 34 transverse to the bearer arms 31 and is mounted on guides 36, which in turn are displaceably mounted on the bearer arms 31, so that it can be held in a given angular position. The second linkage containing the second axis 35 is indicated by 37. The relevant linkage bolt 38 can be seen in FIGS. 1 and 2. The guides 36 are each formed of a plate 39, arranged vertically and rounded underneath, to the outside of which are secured spaced guide eyes 41. Clamping screws 42 are provided to hold the frame 34 in a given angular position: these pass through the plates 39 in arcuate slots 43 curved around the linkage bolts 38 and engage the arm 44 of the frame 34, e.g. by means of a screw thread. Clamping collars 46 with clamping screws 47 are arranged on the round bars 32 to limit the path of movement w in the horizontal guide indicated generally by 45.

The arms 44 of the frame 34 embrace a second, box-shaped frame 48, open towards the apparatus 4, in which the testing computer 3 is received and can be fixed by set screws or clamping means 49, indicated only generally. The second frame 48 is mounted to swivel relative to the first frame 34 about a horizontal third axis 51. For this purpose a third linkage 52 (not shown in detail) containing the third axis is arranged in the middle between the symmetrically arranged bearer arms 31. The second supporting frame 48 can also be fixed in any given angular position, namely by clamping screws 53 that pass through the web 54 of the first supporting frame 34 in slots 55 curved around the third axis 51 and engage the third carrier frame 48, e.g. by a screw thread.

The device 1 makes possible the following degrees of freedom of the testing computer 3 relative to the apparatus 4, which enable the test computer 3 to be positioned on the apparatus 4:

Height adjustment in the stand 5.
Lateral adjustment by swivelling about the vertical first axis 15 and/or the vertical fourth axis 22.
Tilting about the horizontal second axis 35.
Rotation about the horizontal third axis 51.
Displacement along the longitudinal guides 45 or on the bearer arms 32.

The testing apparatus 4 is one in which the electronic components to be tested are supplied in a guide channel (not shown) to a test station and then removed again therefrom. In this test station electrical connection is made between the contacts of an electronic component and plug contacts on the apparatus side that are formed on the apparatus side part 56 of a connecting plug 57 that provides the electrical connection with the testing computer 3. The direction of insertion of the plug (arrow 58) is horizontal, i.e. parallel to the bearer arms 31.

For the purpose of fixing the testing computer 3 to the apparatus there are centering elements and at least three tension couplings arranged in the form of a star around the connecting plug.

To the right and left of the connecting plug 57 there are two centering pins 59 on the connection side 61 of the testing computer 3, and corresponding centering recesses 62 on the connection side 63 of the apparatus 4. In addition there are four tension couplings 64, each having a fixed coupling element and a moveable coupling element. The moveable coupling elements are formed by oblique surfaces 65 on displaceable slides 66 that are displaceably guided on the connection side 63 of the apparatus 4. Arranged on the connection side 61 of the testing computer 3 are fixed coupling lugs 67 that can, by positioning the testing computer by displacement or otherwise, be brought into a position in which they are engaged from behind by the oblique surfaces 65 of the slides 66. Two vertically moveable slides 66 are provided, spaced apart horizontally and formed of rails, that can be adjusted by means of a crank drive 68 arranged on the upper end of the connection side 63 and having a horizontally disposed crankshaft and connecting rods 69 linked to the slides 66 and an adjusting lever 71.

The oblique surfaces 65 are formed by oblique slots 72 in the slides 66. The slots 72 or the oblique surfaces 65 preferably run obliquely downwards towards the apparatus 4, so that the weight of the testing computer 3 itself assists the tension effect exerted by the oblique surfaces 65. The vertical distance between the four tension couplings 64, which are disposed around the connecting plug 57 in the form of a star, is indicated in FIG. 1 by c. The coupling lugs 67 extend parallel to the connection side 61 and transverse to the vertical slides 66 and are carried in sockets 73.

In the mouth region of the grooves 72, these are widened out by recesses 74 that facilitate insertion of the coupling lugs 67 into the slots 72.

Before the test computer 3 is put in position on the apparatus 4 it is set up, using the degrees of freedom of the device 1, so that the pins of the connecting plug 57 or the centering elements 59, 62 are coaxial. The test computer is then displaced with the bearer arms 34 and 48 in the horizontal guide 45 until the coupling lugs 67 are over the oblique surfaces 65, so that the vertical walls of the recesses 74 can serve as stops. The slides 66 are then raised by operating the crank drive 68, so that tension coupling to the connection side 63 of the apparatus 4 then occurs automatically. The test computer 3 is thus automatically moved forward in the longitudinal guide 45. To release the testing computer it is only necessary to release the tension couplings 64: the testing computer 3 is then automatically pushed at least partly out of its plug connection (centering elements 59, 62, connecting plug 57) by reason of the oblique grooves 72.

What is claimed is:

1. A system for docking a first apparatus comprising a testing computer to a second apparatus comprising a handler for electrical components for the purpose of engaging electrical connecting contacts provided at both apparatus and corresponding position, comprising centering pins on said first apparatus and corresponding centering recesses on the second apparatus, comprising fixed and laterally projecting coupling elements on said first apparatus and coupling elements movable between and opening position and a closing position on the second apparatus, said coupling elements being provided with an oblique coupling surface for engaging the fixed coupling elements from behind, the movable coupling elements having a stop for the fixed coupling elements defining a certain initial distance for docking, for the centering pins to enter the centering recesses without making it possible for the electrical connecting contacts to enter into engagement with each other, and the electrical connecting contacts being engageable in precise position by counterbalancing said second apparatus as a result of adjusting the movable coupling elements from the opening position to the closing position, characterized in that the movable coupling elements are formed by two rails provided on said second apparatus, and two oblique guidance surfaces are provided on each rail, said guidance surfaces running in a longitudinal direction of the rails, wherein each oblique guidance surface co-acts with one of four fixed coupling elements, such that the rails are displaceable in their longitudinal direction for engagement and disengagement.

2. A system according to claim 1, characterized in that the oblique guidance surfaces are formed by oblique slots provided in the rails, and that every slot departs from a recess in the rail forming the stop for a corresponding fixed coupling element.

3. A system according to claim 1, characterized in that the rails are commonly displaceable in said longitudinal direction.

4. A system according to claim 1, characterized in that the fixed coupling elements are formed by lugs projecting laterally from a socket.

5. A system according to claim 1, characterized in that the movable coupling elements are provided on the handler and the fixed coupling elements on the testing computer.

* * * * *